Jan. 16, 1940.   H. F. HABLITZEL   2,187,711
ANIMAL FEEDING MEANS
Filed April 18, 1939    2 Sheets-Sheet 1
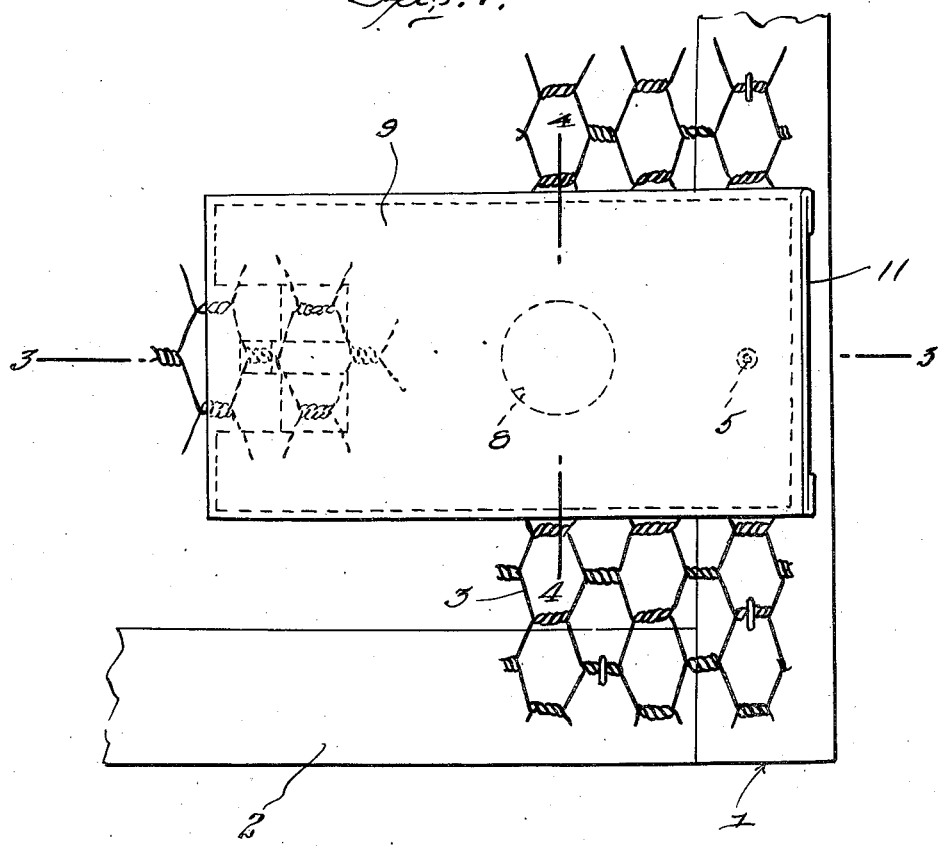
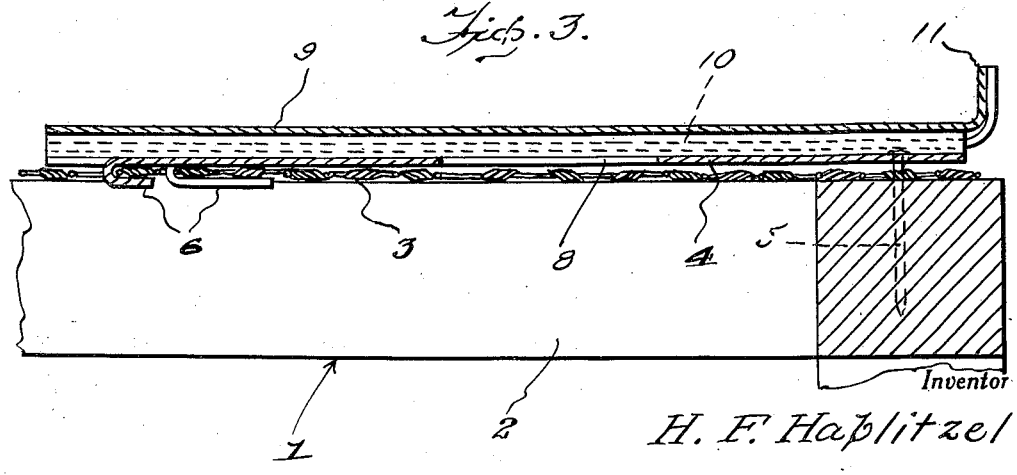
Inventor
H. F. Hablitzel
By Clarence A. O'Brien
and Hyman Berman
Attorneys Jan. 16, 1940.       H. F. HABLITZEL       2,187,711
ANIMAL FEEDING MEANS
Filed April 18, 1939       2 Sheets-Sheet 2
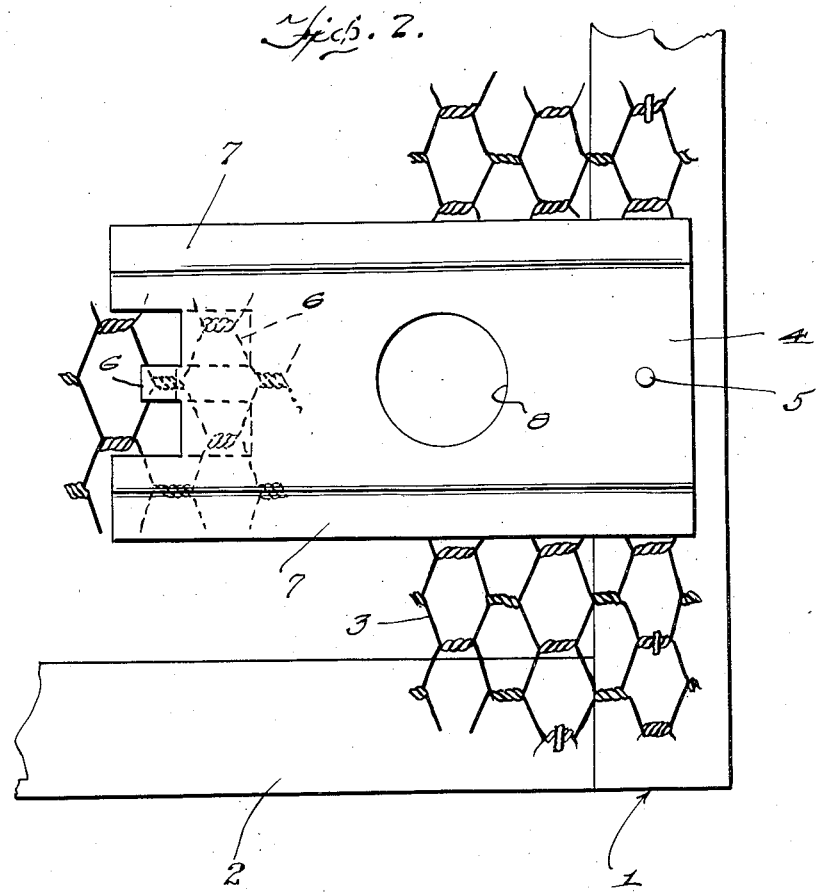
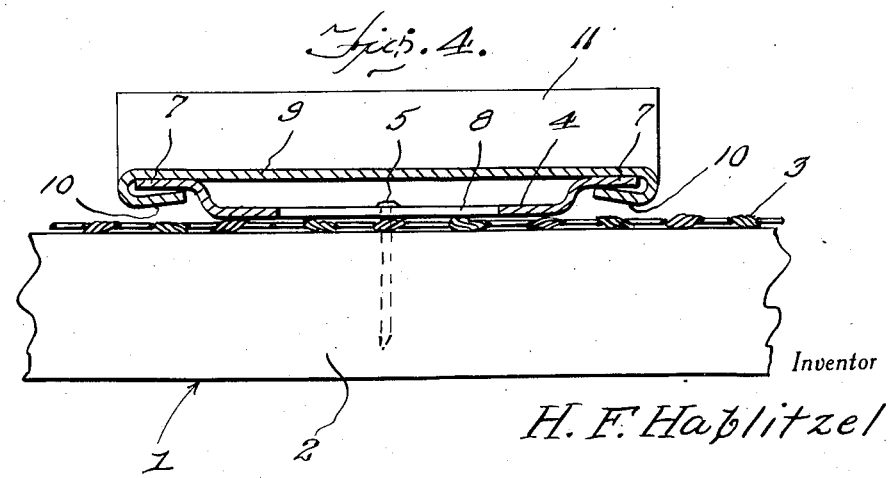
Inventor
H. F. Hablitzel
By Clarence A. O'Brien
and Hyman Berman
Attorneys Patented Jan. 16, 1940

2,187,711

UNITED STATES PATENT OFFICE 2,187,711

ANIMAL FEEDING MEANS

Harvey Franklin Hablitzel, Long Lake, Wis.

Application April 18, 1939, Serial No. 268,589

1 Claim. (Cl. 119—20)

The present invention relates to new and useful improvements in animal feeding means and has for its primary object to facilitate the feeding of penned or caged animals such as mink, etc.

Another very important object of the invention is to provide a device of the character described which as adapted to be expeditiously mounted for operation on a conventional wire pen.

Other objects of the invention are to provide an animal feeding means of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an animal feeding means constructed in accordance with the present invention, showing the device mounted on a pen.

Figure 2 is a view similar to Fig. 1 but with the slidable closure omitted.

Figure 3 is a view in vertical longitudinal section, taken substantially on the line 3—3 of Fig. 1.

Figure 4 is a cross sectional view, taken substantially on the line 4—4 of Fig. 1.

Referring now to the drawings in detail, it will be seen that the reference numeral 1 designates generally a corner portion of a conventional animal pen. The pen 1 includes a frame structure 2 of wood having secured thereon the usual wire 3.

The embodiment of the present invention which has been illustrated comprises an elongated plate 4 of suitable sheet metal which is mounted on top of the pen 1. The outer end portion of the stationary plate 4 is firmly secured to the adjacent member of the frame structure 2 by one or more nails, as at 5. Struck from the inner end portion of the plate 4 are tongues 6 which are bent through and under the wire 3. This is shown to advantage in Fig. 3 of the drawings.

The plate 4 further includes raised or upwardly offset longitudinal marginal portions 7. Formed in an intermediate portion of the plate 4 is a circular opening 8 of suitable diameter. Below the opening 8 a registering opening is cut in the wire 3 of the pen 1.

Slidably mounted on the stationary plate 4 is a closure 9 which is also of any suitable sheet metal. The closure 9 comprises inturned longitudinal marginal flanges 10 which are slidably engaged beneath the raised marginal portions 7 of the plate 4. These flanges 10 frictionally engage the portions 7 to prevent too free sliding movement of the cover plate on the plate 4. The outer end portion of the closure 9 is bent upwardly in a manner to provide a handle 11.

It will thus be seen that a means has been provided whereby penned animals may be conveniently fed in a sanitary, generally satisfactory manner. Of course, the closure 9 is removed or retracted sufficiently on the plate 4 to expose the opening 8 for the passage of the feed therethrough. The usual feed board may be placed in the pen below the opening 8. The construction and arrangement is such that the feed is prevented from contacting and clinging to the wire 3 where it accumulates and freezes or decays in the practice in substantially universal use at present wherein said feed is simply forced through the openings in said wire. The member 9, when in closed position, covers the plate 4 and protects said plate from the weather. The device may be expeditiously installed for use on a conventional pen by simply cutting a hole or opening in the wire for registry with the opening 8.

It is believed that the many advantages of an animal feeding means constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

Means for facilitating placing food in a wire covered pen forming frame comprising an elongated plate having a hole therein, a fastener passing through an end portion of the plate into a part of the frame with said plate covering a portion of the wire, tongues formed on the other end of the plate, said tongues being bent over portions of the wire to fasten said other end of the plate to the wire, said wire having a hole therein with which the hole in the plate registers whereby food can be passed through the two holes into the pen, the side edges of the plate being bent outwardly away from the wire to form flanges which are spaced from the wire and a cover plate having its side edges bent to form channels for receiving the flanges of the first plate to slidably support the cover plate on the first plate, the channel parts frictionally engaging the flanges to prevent too free sliding movement of the cover plate on the first plate, one end of the cover plate having a bent portion forming a handle.

HARVEY FRANKLIN HABLITZEL.